UNITED STATES PATENT OFFICE.

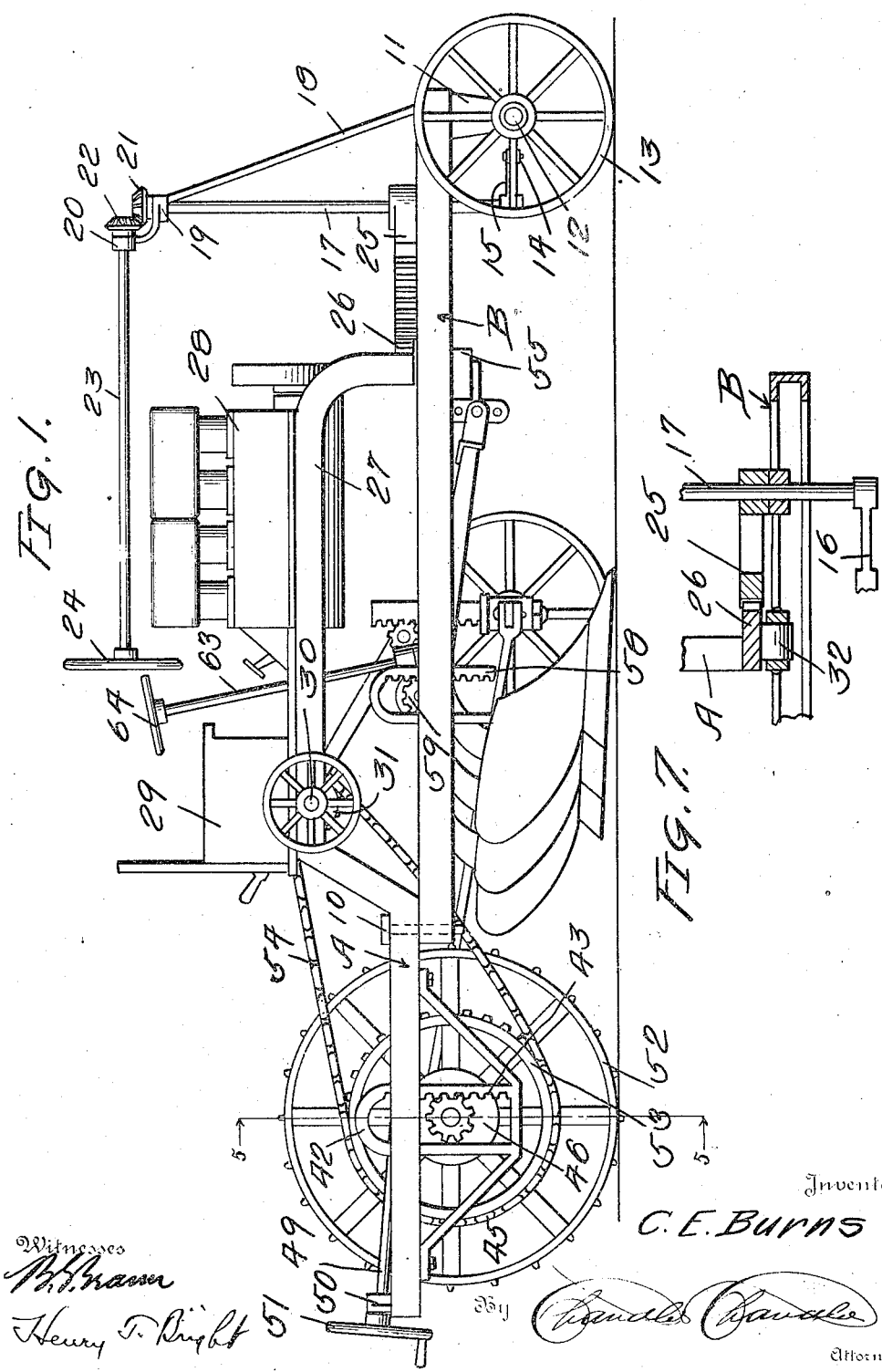

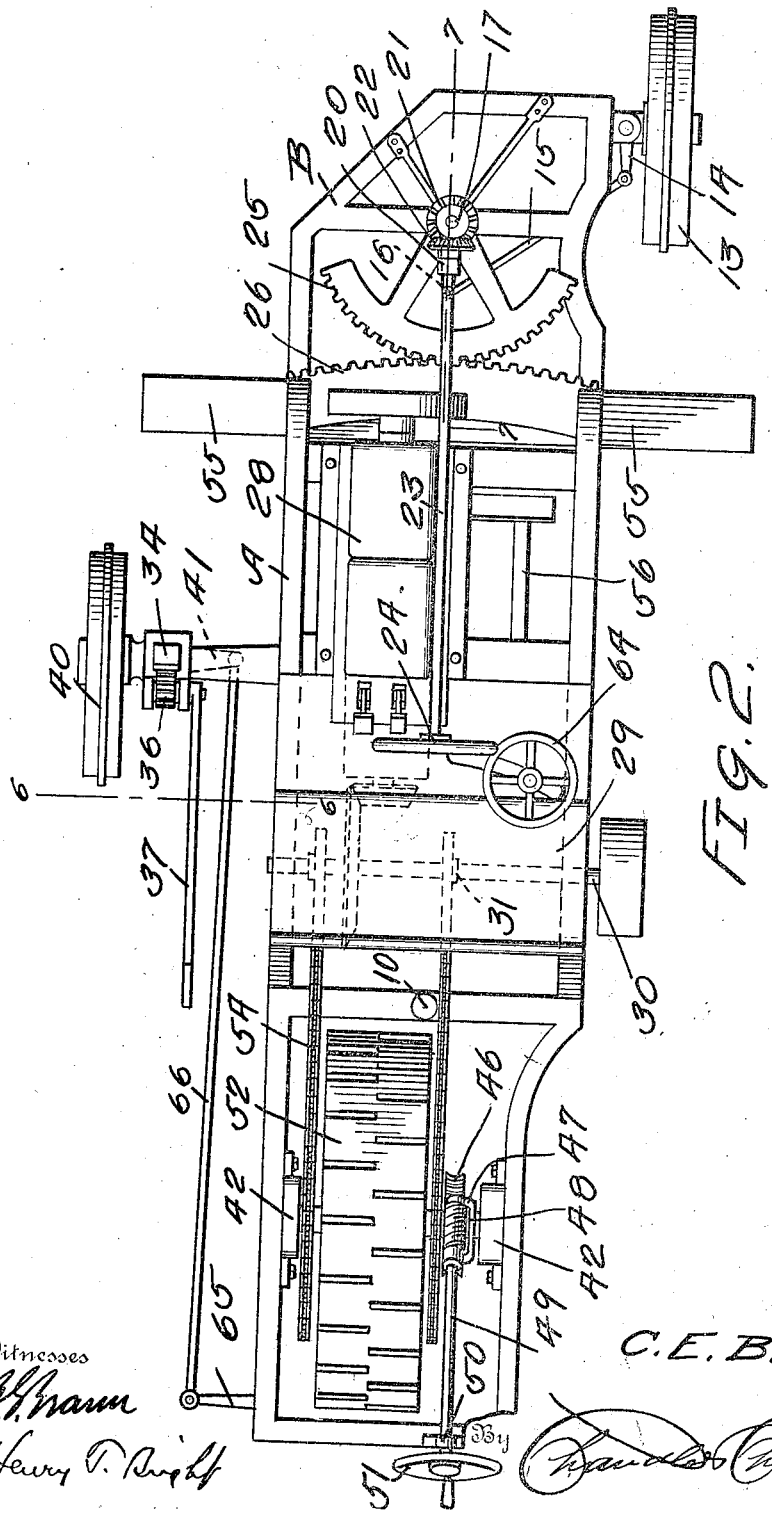

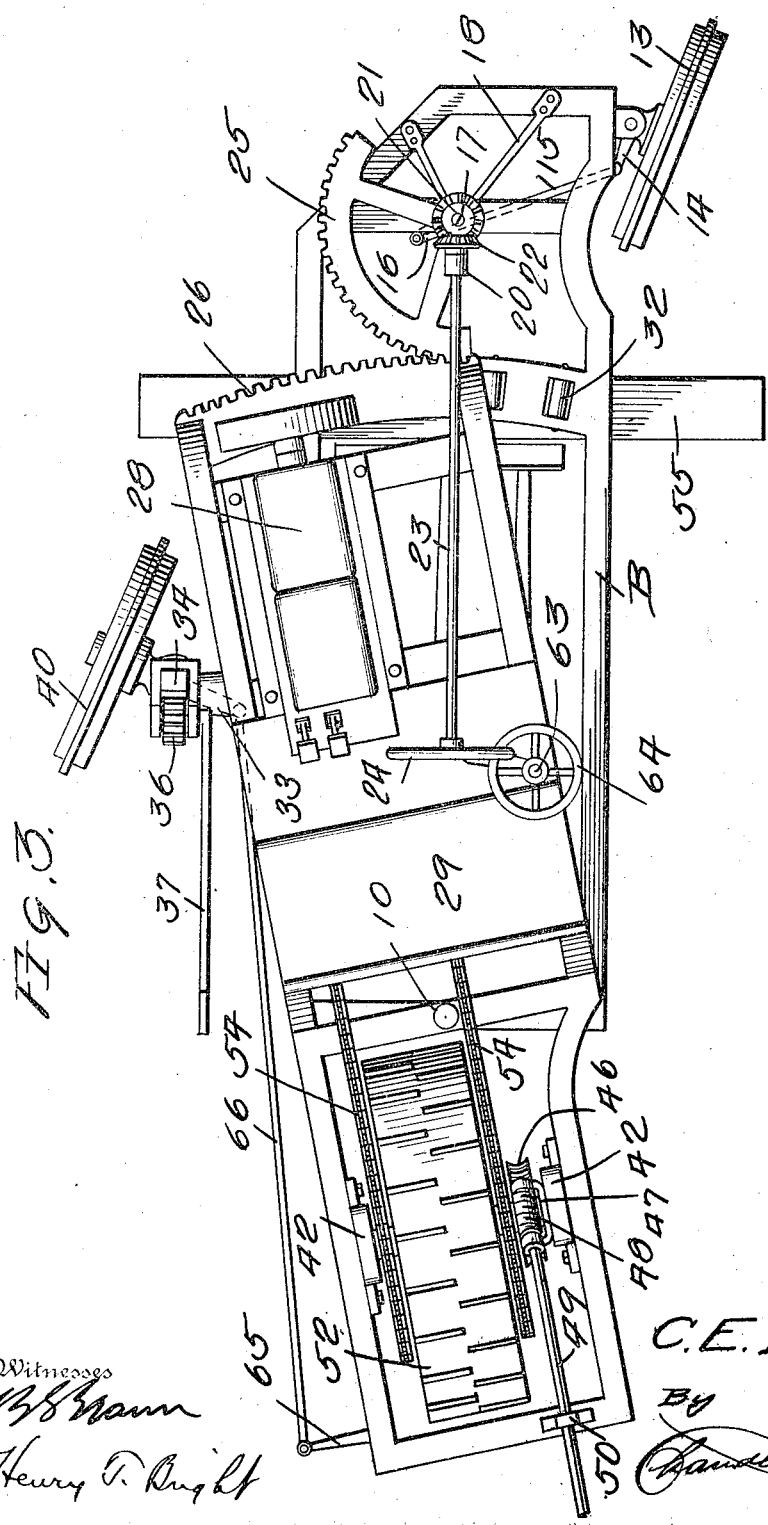

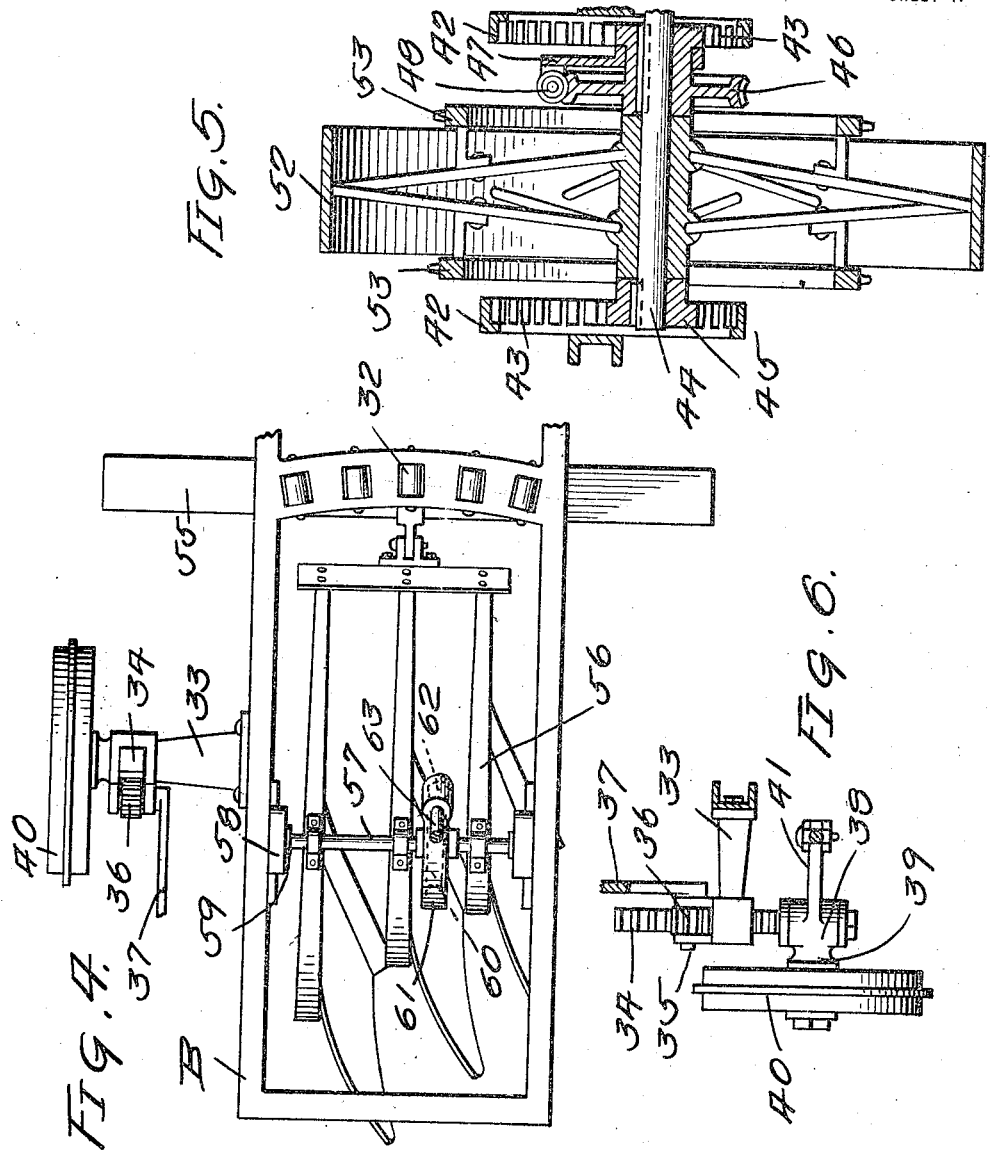

CHARLES E. BURNS, OF MOMENCE, ILLINOIS.

MOTOR-PLOW.

1,197,009.  Specification of Letters Patent.  Patented Sept. 5, 1916.

Application filed April 26, 1915. Serial No. 24,112.

*To all whom it may concern:*

Be it known that I, CHARLES E. BURNS, a citizen of the United States, residing at Momence, in the county of Kankakee, State of Illinois, have invented certain new and useful Improvements in Motor-Plows; and I do hereby declare the following to be a full, clear, and exact description of the invention, such as will enable others skilled in the art to which it appertains to make and use the same.

This invention relates to motor plows.

The object of the invention resides in the provision of a motor plow embodying an improved construction designed to facilitate the turning of the plow to the right or left and render the parts readily adjustable to meet the various conditions as they arise.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which, Figure 1 is a side elevation of a motor plow constructed in accordance with the invention; Fig. 2, a plan view of same; Fig. 3, a view similar to Fig. 2 with the parts in position to effect turning of the plow to the right; Fig. 4, a plan view of a portion of the lower frame of the plow and associated parts; Fig. 5, a section on the line 5—5 of Fig. 1; Fig. 6, a section on the line 6—6 of Fig. 2; and Fig. 7, a section on the line 7—7 of Fig. 2.

Referring to the drawings the improved motor plow includes upper and lower frames A and B respectively. The inner ends of said frames being disposed in overlapping relation and pivotally connected by a king bolt 10 which passes through the extreme inner end of the frame B and the intermediate portion of the frame A. Depending from the forward end of the frame B is a bracket 11 in which is pivotally mounted for movement in a horizontal plane a stub axle 12 upon which is mounted a traction wheel 13 through the medium of which latter the plow is steered in a manner that will hereinafter appear. The stub axle 12 is provided with a rearwardly projecting arm 14 which is connected by a link 15 to an arm 16 fixed on a vertical steering shaft 17 which latter is rotatably mounted on the frame B. A brace rod 18 is mounted on the frame B and carries at its upper end bearings 19 and 20, the shaft 17 being rotatably engaged in the bearing 19. Fixed on the upper end of the shaft 17 is a beveled gear 21 which meshes with a beveled gear 22 fixed on a shaft 23 rotatable in the bearing 20. The rear end of the shaft 23 has fixed thereon a hand wheel 24 whereby the shaft 23 may be conveniently rotated in effecting the steering of the plow. Also fixed on the shaft 17 is a segmental gear 25 which meshes with a segmental gear 26 on the forward end of the frame A and whereby rotation of the shaft 17 in a direction to effect steering to the right will swing the forward end of the frame A to the left. It will be noted that the forward end of the frame A is arched as at 27 and supported on this arched portion is a motor 28 of the explosive type and an operator's seat 29, the latter being so located that an operator seated thereon can readily grasp the hand wheel 24 to control the steering of the plow. Journaled on the arched portion of the frame A is a transverse drive shaft 30 which is operatively connected which the motor 28 in any suitable manner and has fixed thereon sprocket wheels 31 for a purpose that will presently appear. The forward end of the frame A is supported upon roller bearings 32 suitably mounted in the frame B and whereby pivotal movement of the frame A is facilitated. Extending laterally from the side of the frame B opposite to the wheel 13 is a bracket 33 having mounted therein for vertical movement a rack 34. Rotatably mounted on the bracket is a shaft 35 which has fixed thereon a pinion 36 which meshes with the rack 34. Also fixed upon the shaft 35 is a lever 37 for a purpose to be hereinafter referred to. Rotatably mounted on the lower end of the rack 34 is a sleeve 38 from which projects a stub axle 39 having mounted thereon a traction wheel 40. Also projected from the sleeve 38 is an arm 41 disposed oppositely to the axle 39 and for a purpose that will presently appear. The side of the frame B adjacent the wheel 40 can be raised and lowered by oscillating the lever 37, the pinion 36 coöperating with the rack 34 during such operation.

Depending from the side members of the frame A at the rear of the frame B are brackets 42 respectively and supported by each bracket and secured to the frame A is an arch rack 43. Disposed between the racks 43 is a transverse shaft 44 which has fixed thereon pinions 45 meshing respectively with the racks 43. Fixed upon the shaft 44 is a worm wheel 46 and loosely mounted upon said shaft 44 between the worm wheel 46 and the adjacent rack 43 is a bracket 47 in which is journaled a worm 48 meshing with the worm wheel 46. The worm 48 forms an integral part of a rearwardly extending shaft 49 which operates in a bearing 50 on the frame A and carries a hand wheel 51 for the purpose of effecting rotation thereof. Loosely mounted on the shaft 44 is a traction wheel 52 and secured on each side of this traction wheel is a sprocket wheel 53. The sprocket wheels 53 are disposed in alinement respectively with the sprocket wheels 31 and traveling on alined sprocket wheels 53 and 31 are sprocket chains 54 whereby the power of the motor 28 is transmitted to the wheel 52 for the purpose of propelling the plow along the ground. It will be obvious that by rotating the shaft 49 the shaft 44 can be moved up and down and the rear portion of the frame A raised and lowered.

Extending transversely of the frame B is a draw bar 55 to which is pivotally connected for movement in a vertical plane a plow gang 56 the elements of which are mutually connected by a transverse shaft 57 rotatably mounted thereon. Mounted on the side members of the frame B are vertical racks 58 respectively and fixed on the ends of the shaft 57 and meshing respectively with the racks 58 are pinions 59. Fixed on the shaft 57 is a worm wheel 60 surrounded by a casing 61 loose on the shaft 57. Journaled in the casing 61 is a worm 62 which meshes with the worm wheel 60 and forms an integral part of a shaft 63 which latter carries a hand wheel 64. By rotating the shaft 63 through the medium of the hand wheel 64 it will be obvious that the shaft 57 will be rotated. Owing to the connection between the shaft 57 and the racks 58 the rotation of said shaft will raise and lower same and in turn raise and lower the rear end of the plow gang 56.

Projecting latterly from the frame A is an arm 65 the free end of which is connected to the free end of the arm 41 by a link 66. By this construction it will be obvious that when the frame A is swung during the steering operation a steering movement will be imparted to the wheel 40 corresponding to the simultaneous steering movement of the wheel 13.

The plow herein described is particularly adapted to meet the requirements necessary for operating in small or irregular fields although it can be used with equal facility in operating in large and regular fields. The construction of the machine is such that the operator is enabled to turn corners without the machine leaving the furrow.

What is claimed is:—

1. In a motor plow, the combination of upper and lower frames pivotally connected together for relative movement in a horizontal plane, a steering wheel supporting the lower frame on one side, steering mechanism for imparting steering movement to said steering wheel, a second steering wheel supporting the lower frame on the side opposite to the first steering wheel, a traction wheel supporting the upper frame at its rear end, means carried by the steering mechanism for swinging the forward end of the upper frame in a direction opposite to the steering movement of the first steering wheel, and connections between the upper frame and the second steering wheel whereby pivotal movement of said upper frame will impart a steering movement to the second steering wheel corresponding to the steering movement of the first steering wheel.

2. In a motor plow, the combination of upper and lower frames pivotally connected together for relative movement in a horizontal plane, a steering wheel supporting the lower frame on one side, a steering mechanism for imparting steering movement to said steering wheel, a segmental gear carried by said steering mechanism, a segmental gear carried by the upper frame and coöperating with the gear of the steering mechanism whereby the forward end of the upper frame is moved oppositely to the steering movement of said steering wheel, a second steering wheel supporting the lower frame on the side opposite to the first steering wheel, a traction wheel supporting the upper frame, and connections between the upper frame and the second steering wheel whereby pivotal movement of the upper frame will impart a steering movement to the second steering wheel corresponding to the steering movement of the first steering wheel.

In testimony whereof, I affix my signature, in the presence of two witnesses.

CHARLES E. BURNS.

Witnesses:
L. H. GUERTIN,
J. D. LA PLANTE.